March 21, 1967    H. R. HUFFMAN ET AL    3,310,438
DISPERSION STRENGTHENED LEAD BATTERY GRIDS
Filed Feb. 17, 1966    2 Sheets-Sheet 1
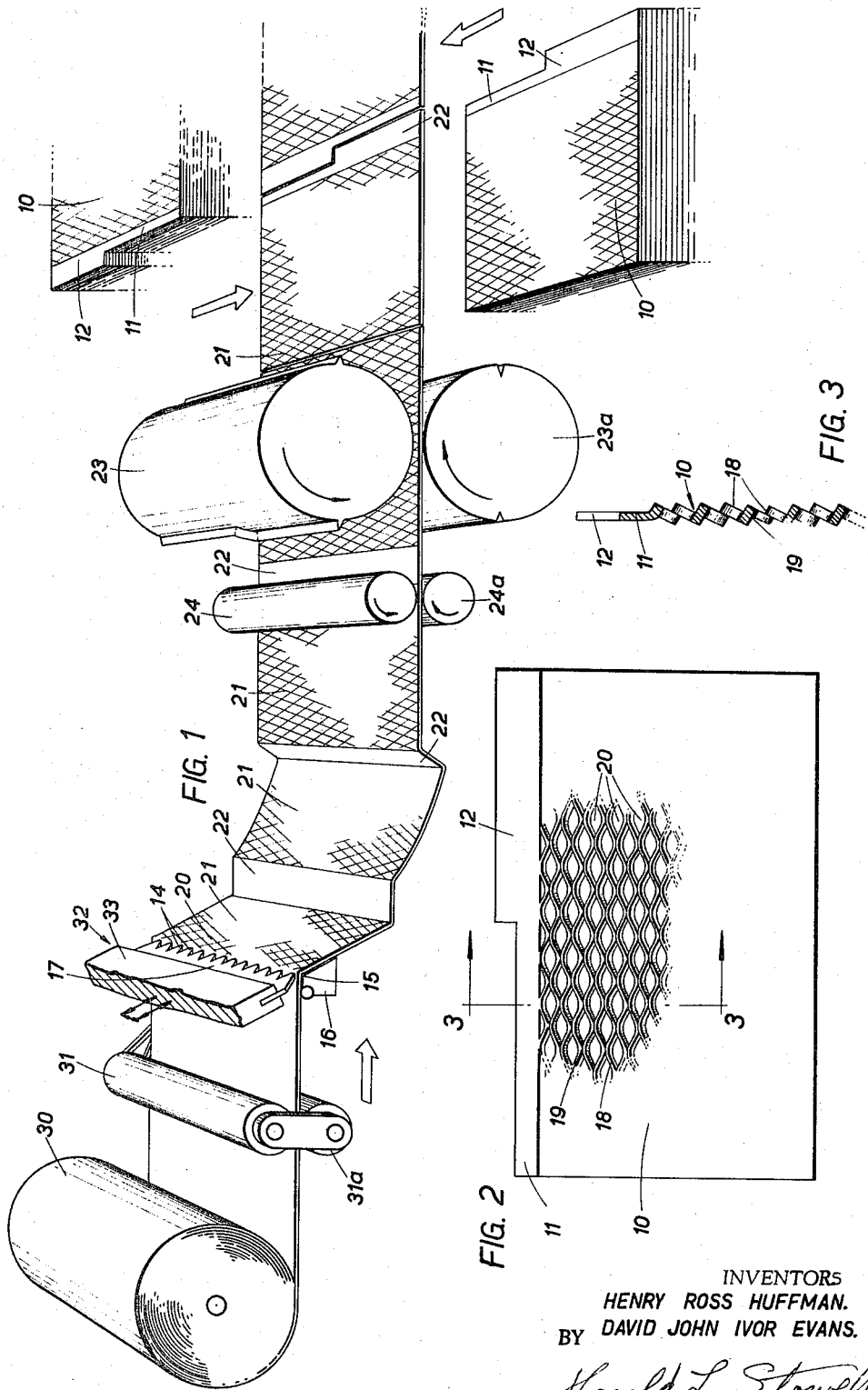
INVENTORS
HENRY ROSS HUFFMAN.
DAVID JOHN IVOR EVANS.
BY
Harold L. Stowell
Attorney.

United States Patent Office 3,310,438
Patented Mar. 21, 1967

3,310,438
DISPERSION STRENGTHENED LEAD
BATTERY GRIDS
Henry R. Huffman and David John Ivor Evans, both of Edmonton, Alberta, Canada, assignors, by mesne assignments, to St. Joseph Lead Company, New York, N.Y., a corporation of New York, and Tsumeb Corporation Limited, Tsumeb, South-West Africa, a corporation of South-West Africa
Filed Feb. 17, 1966, Ser. No. 536,507
3 Claims. (Cl. 136—36)

This application is a continuation-in-part of application Ser. No. 293,510 filed July 8, 1963.

This invention relates to lead-acid storage batteries and more particularly to improvements in the grids which support the active material of the plates in such batteries.

The grids for lead-acid storage batteries are commonly of cast lead or cast lead alloys. From the point of view of electro-chemical performance, pure lead is the most suitable material for lead acid battery grids. However, because of its low tensile and yield strengths and tendency to creep, even at room temperatures, pure lead is generally unsuitable for battery grids except for a few highly specialized applications. A large number of lead alloys of various compositions have been proposed in an effort to improve the physical properties of pure lead for use as grid material. The most common of such alloys are lead-antimony alloys containing from about 5% to about 12% antimony. While alloying with antimony increases the strength and creep resistance of the lead and, in addition, improves its casting qualities, it has deleterious side effects in that the corrosion resistance of lead-antimony alloys in dilute sulphuric acid solutions is substantially less than that of pure lead. Also, the addition of antimony increases the electrical resistivity of lead. Further, the presence of antimony in the electrolyte as a result of corrosion of lead-antimony alloy grids is believed to be a contributing cause of "local action" or self-discharge of the battery on standing, which is characteristic of batteries using this type of grid.

Various other special lead alloys containing, for example, small amounts of tin, arsenic, calcium, silver, etc., have been proposed in an effort to overcome the inherent disadvantages of lead antimony alloys but none has been entirely successful in this regard.

The primary object of the present invention is to provide lead-acid battery grids which possess essentially the same electro-chemical properties as pure lead grids but which have greatly superior strength and resistance to creep. Another object of this invention is to provide lead-acid battery grids that possess physical strength properties generally equal to those of lead-antimony alloys but which have electro-chemical properties superior to those of such alloys. A further object of this invention is to provide a new method of fabricating battery grids from a novel material which possesses essentially the same electro-chemical properties as pure lead, but which has strength properties greatly superior to pure lead.

Other objects and advantages of this invention will become readily apparent from a reading of the following description and a consideration of the related drawings wherein:

FIGURE 1 is a diagrammatic representation illustrating a method which may be utilized to produce battery grids according to the present invention;

FIGURE 2 is a plan view of a battery grid embodying the features of the invention;

FIGURE 3 is a cross-sectional view taken along the line 3—3 in FIGURE 2;

Like reference characters refer to like parts throughout the description of the drawings.

Broadly, the novel battery grids of this invention consist in cellular grid-like structures which are formed of dispersion strengthened, wrought lead material and which are of a configuration suitable for use in lead-acid storage batteries.

The wrought lead material contemplated by this invention consists of lead metal which contains a uniformly dispersed phase of finely divided, discrete lead oxide particles. This material is produced by a novel procedure by which oxide coatings are formed on the surfaces of finely divided lead particles under controlled conditions, and the oxide films thus formed are subsequently broken into finely divided, discrete particles and uniformly dispersed in a polycrystalline lead matrix by subjecting the oxide coated lead particles to plastic deformation. Dispersion strengthened lead produced in this manner has physical and electro-chemical properties which make it particularly suitable for lead-acid storage battery grids. The tensile and yield strengths of such material and its resistance to creep is generally equal to or superior to that of the lead-antimony alloys commonly employed for battery grids. Also, its electrical resistivity and resistance to corrosion in sulphuric acid solutions is essentially the same as pure lead, and it is thus superior in these respects to lead-antimony alloys.

The dispersion strengthened, wrought lead utilized by this invention cannot be fabricated into grids by the conventional casting methods as it will, of course, lose its physical strength properties if it is heated above the melting temperature of the lead matrix. Therefore, according to the present invention, grids are fabricated by procedures involving only cold mechanical working of the wrought lead material. Such procedures include, for example, extrusion and/or roll compacting to produce dispersion strengthened lead strip of appropriate thickness followed by punching of grids of suitable configuration from the strip or by expanding the strip to produce the appropriate cellular structure.

Considerable waste or re-cycling of material is involved in the punching techniques and thus the preferred procedure is to use metal expanding techniques in which strips or sheets of dispersion strengthened lead are expanded using conventional or modified metal expanding methods to produce a cellular structure of suitable configurations for use as grids.

Figure 4:
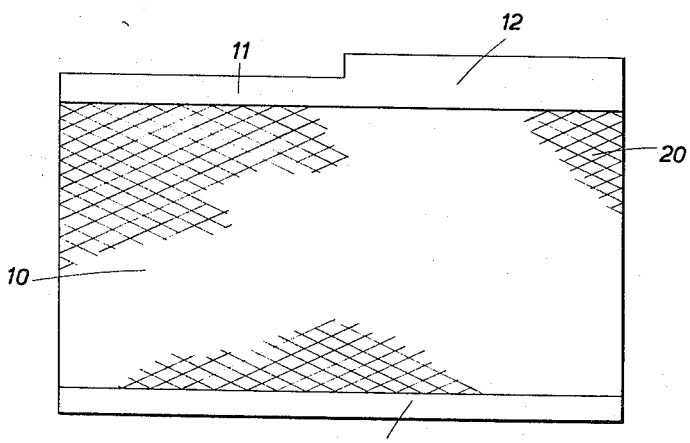
FIGURE 4 is a plan view of a battery grid illustrating a second form of grid embodying the features of the invention.

FIGURES 2 and 4 illustrate two types of grids which embody the features of this invention and which are produced in accordance with a metal expanding technique which will be explained in more detail hereinbelow. The grids consist of a cellular body portion 10 consisting of interconnected strands of dispersion strengthened lead defining openings suitable for retaining the active material conventionally employed in lead-acid batteries. Along the upper edge of the grid is a margin 11 of unexpanded metal having a terminal portion 12 projecting therefrom. The width of the margin and terminal portion is determined by the particular application for which the grid is intended. FIGURE 4 shows a slightly modified form of the grid which has a margin 13 of unexpanded metal along the lower edge of the grid. Once again, the necessity for this margin and its width will be determined by operating circumstances.

Figure 5:
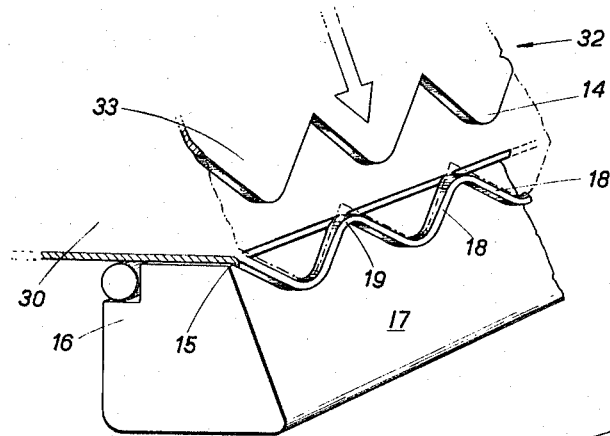
FIGURES 5 and 6 are diagrammatic representations illustrating the manner in which the strip is slit and expanded in one operation.
Figure 6:
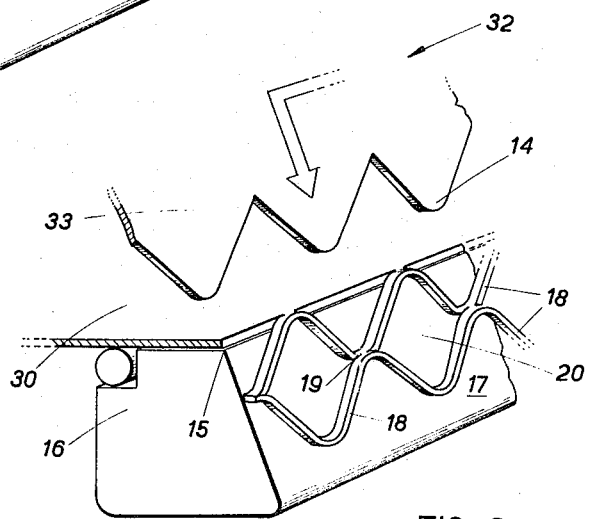

FIGURES 1, 5 and 6 illustrate diagrammatically a preferred procedure by which these grids are produced on a continuous basis from dispersion strengthened lead strip or sheet by application of modified metal expanding techniques.

Referring to FIGURE 1, a roll of dispersion strengthened lead strip 30, of suitable width and thickness, is fed by means of a suitable feed mechanism, depicted by rolls 31, 31a, into a metal expander, indicated generally by the numeral 32. The expander slits and stretches or expands the strip to produce the cellular structure characteristic of expanded metal.

In the preferred method of metal expanding illustrated in FIGURES 1, 5 and 6, the expander 32 functions to slit and stretch or expand the strip simultaneously. This is achieved by means of an expanding tool 33 having a row of sharp-edged, shaped teeth 14 which co-act with the sharp upper edge 15 of a support block 16 to provide a shearing action when the expanding tool 33 is reciprocated substantially vertically in the plane of the face 17 of the support block 16. Preferably, the face 17 of the support block 16 is inclined from the vertical and the teeth 14 of expanding tool 33 act on the strip at an acute angle thereto. In operation, the strip 30 is fed into the expander at a controlled rate such that on each cutting stroke a transverse row of strands 18 of predetermined width and length are sheared and formed into arcuate loops in the plane of block face 17 as illustrated most clearly in FIGURE 5. The bonds 19 connecting each strand to the next adjacent aligned strands are not sheared and remain integral with starting strip 30. The width, length and shape of the strands 18 are determined by the thickness, spacing and shape of the teeth 14.

The expanding tool 33 is reciprocated sideways a distance equal to one-half the length of the strand loops on each cutting stroke such that the connecting bonds 19 of strands 18 are staggered, as shown in FIGURE 6, producing the substantially diamond-shaped openings 20 characteristic of expanded metal.

The operation of the expander is controlled such that segments of expanded strip 21 are alternated with unexpanded segments 22. The expanded portions 21 subsequently form the cellular body portion 10 of two grids which are cut from the strip by blanking rolls 23, 23a, or other suitable means, and the unexpanded portion 22 forms the margin 11 and terminal portion 12 of a pair of grids. It will be evident that the length of the expanded and unexpanded portions 21, 22 can be controlled to control the length of the cellular body portion 10 and terminal portion 12 depending on the dimensions required for the final grid. Grids, such as that shown in FIGURE 4 having a margin 13 of solid material along the lower edge, are obtained simply by regulating the expander and strip feed such that a segment of unexpanded material is provided for this as well as for the terminal portion 12.

The strip emerging from the expander having alternating expanded and unexpanded segments will have the step-like configuration shown in FIGURE 1. It is desirable to make the segments co-planar prior to blanking out the grids. In the embodiment illustrated, a pair of levelling rolls 24, 24a are employed for this purpose. The levelled strip is then passed through the blanking rolls 23, 23a where the finished grids are cut from the strip.

A method of producing the dispersion strengthened wrought lead from which the grids of this invention are fabricated is described in detail in co-pending United States application Ser. No. 202,053. Briefly, this method consists in forming an oxide film on the surfaces of finely divided lead particles under controlled conditions and, thereafter, breaking the lead oxide film into finely divided particles and dispersing them in a lead matrix.

An illustrative method of forming the oxide films on the lead particles consists of moistening the surfaces of finely divided lead particles with water and mixing the moistened particles while exposed to free oxygen bearing gas to form a film or coating of lead oxide on the surfaces of the individual lead particles. The water can be provided in vapour form mixed with the oxidizing gas, or it can be added as a liquid directly to the powder which is then mixed in an oxidizing atmosphere provided, for example, by a stream of air or oxygen enriched air flowing through the oxidation reaction zone.

For a lead powder of a given particle size, the amount of oxide formed on the particles can be controlled by the quantity of water added, provided an excess of oxygen is available in the reaction zone. The amount of water required to produce a given oxide content is dependent on the initial oxide content of the powder and the particle size of the powder. In most cases, lead powder produced by the conventional atomization techniques contains a small amount of oxide in the "as received" state, generally below about 2 weight percent (calculated in terms of PbO). The exact amount of water required to produce the desired oxide content in a given powder is thus a matter to be determined separately in each case taking into account particle size and initial oxide content. In general, the water additions from about 0.25% to about 3.0%, by weight, will be required to produce oxide contents within the range of from about 2.5 to about 15 weight percent, calculated in terms of PbO. It is desirable, in order to obtain the highest possible strength properties with minimum loss in ductility, that the dispersed oxide particles be exceedingly small, of the order of 1 micron or less and preferably below about 0.5 micron, and also that the oxide particles be very uniformly dispersed in the lead matrix of the final wrought product. It is thus preferred to use very finely divided lead powder as the starting material, since the finer the lead particles, the greater is the surface area exposed to the oxidation reaction and the thinner are the oxide layers on the individual particles at any given oxide content; and the thinner the oxide films, the more easily they are broken into sub-micron size and uniformly dispersed in the lead matrix. Satisfactory results are obtained using lead particles of a size up to 150 microns; however, optimum results are obtained with material having a particle size smaller than about 10 microns.

The lead oxide coatings formed on the surfaces of the lead particles are comminuted or broken down into finely divided particles and dispersed uniformly throughout the lead matrix by plastic deformation such as, for example, by extrusion and/or roll compacting. The preferred method is by extrusion since this produces the most severe plastic deformation of the particles and results in optimum comminution and distribution of the oxide films, particularly with extrusion ratios above about 25:1. The plastic deformation step may be conducted to produce a finished commercial product such as tubes, pipes, strip, sheet, or other desired shapes; or it may be conducted to produce an intermediate shape such as a billet which can be further worked to produce a desired product.

For the purposes of the present invention, the known procedure hereinbefore described is followed to obtain dispersion strengthened wrought lead strip which can be processed according to the modified metal expanding technique described above or by other methods such as punching where only cold mechanical working is involved. We have found that wrought lead produced by extrusion of oxide coated lead particles and having between about 0.75 and about 15%, by weight, lead oxide (calculated in terms of PbO) as the dispersed phase, is a satisfactory intermediate material for further processing into the final grid. The preferred material is produced by controlled oxidation of lead powder having a particle size less than about 10 microns to produce an oxide content within the range of about 2.5 to about 10 weight percent (calculated in terms of PbO) followed by compaction into billet form and extrusion of the billet at an extrusion ratio above about 25:1. The rough extrusion is then cold worked by standard rolling techniques to give a wrought lead strip or blank which is the starting material for the grid fabricating operation.

The dispersion strengthened lead used in the storage battery grid of the invention may be made of pure or substantially pure lead or of recovered or "secondary" lead containing any of the normal alloying ingredients found in such lead, all of which materials are intended to be included in the term "lead" as used herein unless otherwise specifically limited. A typical secondary lead may contain, in addition to lead, from traces to about 0.15% of such metals as copper, zinc, iron, nickel, silver, antimony, tin, bismuth and arsenic.

It will be understood that modifications may be made in the improved process of this invention without departing from the scope of the invention defined by the appended claims.

What we claim as new and desire to protect by Letters Patent of the United States is:

1. A storage battery grid consisting essentially of a dispersion strengthened lead alloy, said alloy consisting essentially of a lead matrix containing from about 0.75 to about 15%, by weight, lead oxide, calculated as PbO, in the form of discrete particles of a size below about 3 microns dispersed substantially uniformly through said lead matrix.

2. A storage battery grid as claimed in claim 1 wherein the substantially uniformly dispersed discrete particles of lead oxide are below about 1 micron in size and comprise from about 2.5% to about 10%, by weight, calculated as PbO, of the total composition.

3. A storage battery grid of the type suitable for use in lead acid storage batteries comprising a cellular body portion adapted for retaining the active material of said grid and an adjacent terminal portion, said cellular body portion being formed of expanded, dispersion strengthened, wrought lead and said adjacent terminal portion being formed of unexpanded, dispersion strengthened, wrought lead, said dispersion strengthened lead in both the cellular body portion and the adjacent terminal portion consisting essentially of a lead matrix containing from about 0.75 to about 15% by weight lead oxide, calculated as PbO, in the form of discrete particles of a size below about 3 microns dispersed substantially uniformly through said lead matrix, said lead matrix being substantially pure lead.

References Cited by the Examiner

UNITED STATES PATENTS

| | | | |
|---|---|---|---|
| 1,982,485 | 11/1934 | Solomon et al. | 136—36 |
| 2,621,219 | 12/1952 | Winkel | 136—36 |
| 3,098,293 | 7/1963 | Ebdon | 117—50 |

WINSTON A. DOUGLAS, *Primary Examiner.*

A. SKAPARS, *Assistant Examiner.*